(12) United States Patent
Yang et al.

(10) Patent No.: US 10,958,702 B1
(45) Date of Patent: Mar. 23, 2021

(54) TIMEOUT OPTIMIZATION FOR STREAMING VIDEO

(71) Applicant: Amazon Technologies, Inc., Seattle, WA (US)

(72) Inventors: Yang Yang, Issaquah, WA (US); Yongjun Wu, Bellevue, WA (US); Kevin Matthew McCaw, Seattle, WA (US); Satheesh Ramalingam, Sammamish, WA (US); Viet Anh To, Seattle, WA (US); Alon Dulce, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 118 days.

(21) Appl. No.: 16/128,205

(22) Filed: Sep. 11, 2018

(51) Int. Cl.
*H04L 29/06* (2006.01)
*H04N 21/2387* (2011.01)
*H04N 21/845* (2011.01)

(52) U.S. Cl.
CPC ....... *H04L 65/601* (2013.01); *H04N 21/2387* (2013.01); *H04N 21/845* (2013.01)

(58) Field of Classification Search
CPC . H04L 65/601; H04N 21/2387; H04N 21/845

USPC ......................................................... 709/219
See application file for complete search history.

(56) References Cited

U.S. PATENT DOCUMENTS

| 9,686,332 | B1* | 6/2017 | Binns ................. H04L 65/4092 |
| 2006/0156201 | A1* | 7/2006 | Zhang ................... H04L 47/801 |
| | | | 714/776 |
| 2018/0020031 | A1* | 1/2018 | Chang .................. H04L 65/602 |
| 2020/0036798 | A1* | 1/2020 | Dierckens ............... H04L 69/28 |
| 2020/0037045 | A1* | 1/2020 | Mahvash ......... H04N 21/44004 |
| 2020/0128255 | A1* | 4/2020 | Halepovic ............... H04L 65/80 |

* cited by examiner

*Primary Examiner* — James E Springer
(74) *Attorney, Agent, or Firm* — Eversheds Sutherland (US) LLP

(57) ABSTRACT

Systems, methods, and computer-readable media are disclosed for determining and applying a timeout for streaming video. Processing circuitry of a device may request video fragments to be downloaded and played, and if a requested fragment is not downloaded entirely before expiration of a timeout, the device may adjust the timeout to allow the download to complete. A timeout may be set based on available bandwidth and a size of a fragment requested for download, and the timeout may be extended based on network and/or device conditions.

20 Claims, 7 Drawing Sheets

US 10,958,702 B1

TIMEOUT OPTIMIZATION FOR STREAMING VIDEO

BACKGROUND

Streaming video devices may download and playback video content. If requested streaming video content fails to download in time for continuous playback, then buffering, stalling, artifacts, timeout, or other negative results decreasing video quality and user experience may occur. For example, a video device rendering downloaded video content may render the content as the content is being provided to the device. If the device does is unable to receive content quickly enough to keep pace with the playing of the content, video playback may freeze or otherwise stop, adversely impacting a device's ability to provide continuous playback for a viewer.

Figure 1:
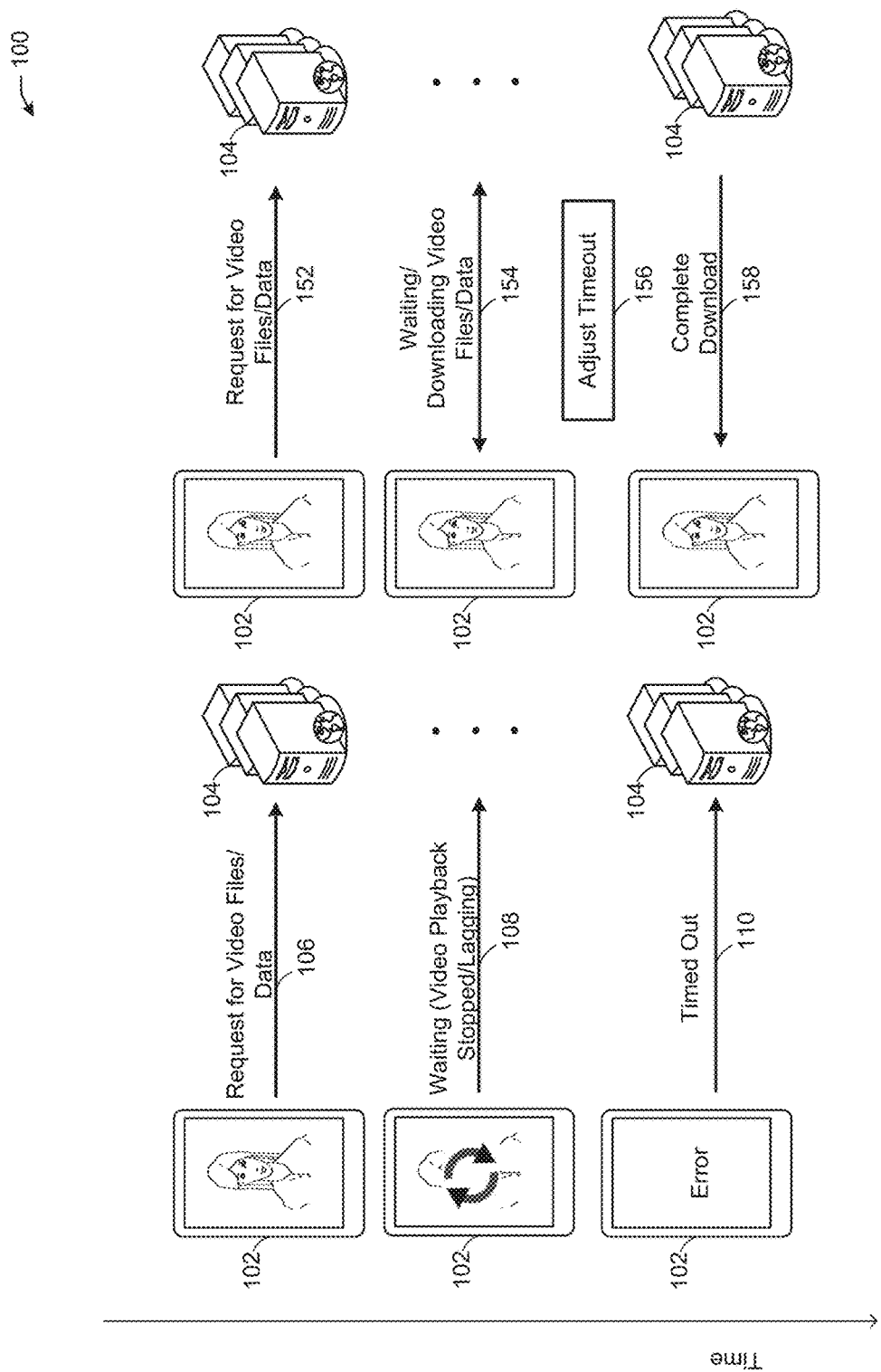
FIG. 1 illustrates a process associated with downloading video data or files, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for streaming video content using a timeout optimization. In one embodiment, a device may request ultra high definition (UHD) video content to be streamed to the device for playback. The device may receive the UHD video stream from another device or system, and may cause playback of the UHD video content at the device or on another device. If the device determines that one or more portions of the requested UHD video content may not be downloaded within a given time, for example, to allow for continuous playback of the content, then the device may determine whether to continue to download requested UHD content or to request more UHD content before a playback error occurs. The device may use a timeout to determine whether streaming video will be downloaded by the device in time to facilitate continuous playback, and the timeout may be adjusted to optimize the video streaming and playback processes.

Streaming video content may be provided by one or more devices, such as content servers or other devices. The content providers may receive a large number of video content requests to send video content streams. If the content providers do not process the requests and provide the requested content quickly enough, streaming video devices may not receive requested video content in time to maintain continuous playback. Other complications may result in requested video content not being provided to streaming video devices in a timely enough manner to maintain continuous playback. For example, network and/or device conditions may result in connection losses and/or an inability to deliver content. Bandwidth may fluctuate, causing a video streaming device to run out of data to display. In particular, UHD content may require more network, memory, and processing resources than video content of lesser quality, thereby increasing the risk of playback error due to failed content delivery.

A timeout may be used to protect against playback error. For example, a timeout may be a time allocated to complete a download. The timeout may be set to avoid a situation in which video content is not downloaded quickly enough to facilitate continuous playback. For example, a device may count down from a timeout to zero, beginning when a request for content is made or when a download begins, and if the timeout expires (e.g., the countdown reaches zero) before a download completes, then the device may cancel the existing request and may re-request the download, resulting in a waste of bandwidth and other resources. However, if a download is close to completing when a timeout expires, rather than cancelling a download request and sending a subsequent download request, the timeout may be extended to allow for completion of a download if the conditions are such that the download is likely to complete without causing a playback error.

For example, if a download is 90% complete (e.g., 90% of a requested video fragment has downloaded) when a timeout expires, then it may be wasteful and inefficient to request and download the same fragment again. Instead, the device may consider device and/or network settings. For example, if only 10% of a requested download remains when a timeout is reached, then it may be more efficient to extend the timeout if there are sufficient bandwidth and computer processing capability to complete a download and provide continuous playback. Some devices may determine a timeout based on a buffer size and a fragment duration, but the timeout may benefit from considering other factors, and from being dynamically adjusted.

For example, streaming video devices may have memory such as a buffer for storing downloaded streaming video frames. As video frames from the buffer are rendered, the buffer may be depleted until/unless additional video frames are downloaded. The buffer also may be flushed at certain times. If the video frames stored in a buffer are played or discarded before additional video frames are downloaded and stored in the buffer, then the buffer may become empty during expected playback. If the buffer has insufficient video frames for playback, then video playback may stall (e.g., freeze) while the device awaits additional downloaded video frames for playback. For example, a decoder of the video streaming device may detect that a buffer's video content is below a threshold amount and may send a message to other device components indicating such.

It may be beneficial for a device to periodically estimate whether video fragments will be downloaded fast enough to avoid a low or empty buffer scenario. The use of a timeout may prevent such a scenario, but the timeout may cause cancellation of a download request even though a download may complete in time to avoid playback error. By recognizing that a download may complete before a playback error may occur due to the expiration of a timeout, a device may react to prevent playback error, cancellation of downloads, and re-requests of failed downloads. In particular, by identifying potential playback problems using computer components and identifying opportunities to complete downloads by extending a timeout, a device's use of resources may be improved. For example, a decoder may not need to use resources to notify other components of the device that a buffer level is too low, and a device may not need to cancel download requests in favor of re-requesting the same downloads if a timeout expires. Instead, the device may adjust the timeout to allow for a download to complete, and other device components may continue to perform video playback and storage functions without interruption or execution of unnecessary processes.

To reduce the chance of a timeout expiration, cancelled download requests, additional download requests, and playback error, a video streaming device may rely on an adjustable timeout (e.g., an amount or period of time). The timeout may be set based on a buffer length and a video fragment duration, for example. However, such calculation of a timeout may be optimized by considering a size of a downloadable video fragment, download bandwidth, and/or other network and device conditions. When a streaming video device requests a video fragment to download, the device may begin a timer to count down the time from the timeout until the entire requested video fragment has been downloaded. If, while downloading streaming video content, a device determines that requested video content will not be downloaded before the timeout period expires (e.g., a count down from the timeout reaches zero), the device may detect a potential playback problem. In this manner, the timeout may be used as protection against possible playback errors. Instead of reaching a timeout (e.g., having a timeout expire), however, a device may estimate if a timeout may expire before a download is complete, and may extend the timeout if doing so would allow for completion of the download without experiencing a playback error and without having to re-request a failed download which may have been close to completion. Therefore, a device's ability to recognize streaming and/or playback errors, efficiently respond to those potential errors, and dynamically adjust parameters associated with video download and playback may be improved, representing an improvement to the functionality of the device and to the processes performed by the device used to prevent computer-specific video streaming and playback problems.

The timeout may be determined based on operating parameters of a streaming device. If a timeout is not tailored to a connection speed/bandwidth or size of a fragment being downloaded, then the timeout may not accurately reflect the likelihood of a fragment being downloaded before playback error occurs. Instead, a timeout expiration may result in cancellation of a download and a re-request for the same download even when the download may be completed before playback error occurs. It may therefore be beneficial for a timeout to be set based at least in part on network conditions and a fragment size.

The timeout may be adjusted to avoid using resources in response to a download failing to complete before expiration of the timeout. If a timeout is static, then recognitions of potential download failures may result in playback interruptions and/or requests for downloads, both of which may be reduced by dynamically adjusting the timeout. Rather than responding to a timeout expiration, the timeout may be adjusted to allow for completion of a download. An adjusted download may also be applied in subsequent download requests to reduce the likelihood of other failed downloads. The timeout may depend on the type of device and its operating parameters.

There are multiple kinds of video players on devices. One kind of player is updatable, such as web players, Android players, and iOS player. Another other kind of player is not updatable, such as Ruby players. Both kinds of players may receive constant or variable bit rate data, for example, in H.264 standard definition (SD) or high definition (HD), high efficiency variable coding (HEVC) SD, HD or UHD. It may be beneficial to adopt different approaches for the different kinds of players.

Video fragments may exist in different sizes and types. For example, a video fragment duration may be decided during content encoding, where a video on-demand (VOD) encoder partitions and inserts instantaneous decoder refresh (IDR) frames on video fragment boundaries. IDR frames are a type of intra-coded video frame (I-frame). I-frames, predicted frames (P-frames), and bidirectional predicted frames (B-frames) may be the video frames in a video fragment. An I-frame may include a complete image of pixels, and may serve as a reference for other video frames. P-frames may include changes in an image from a previous video frame. B-frames may include changes between a current frame and both preceding and proceeding frames. An IDR frame may be sent by a device (e.g., an encoder) to clear the contents of reference frames in a buffer. When a decoder identifies an IDR frame, a decoder may determine that any frames in a buffer may be unusable as reference frames, and all subsequent video frames received may be decoded without reference to a frame decoded prior to the receipt of the DR frame. An IDR frame may be the first frame in a coded video sequence.

The range of fragment duration, [X, Y] seconds, may impact both video compression efficiency and quality of service (QoS) of video streaming across a network. Some video may use constant fragment duration (e.g., two seconds) in all constant bit rate (CBR) video. Other video may be encoded using a 4-second fragment duration in CBR, and hypertext transfer protocol live streaming (HLS) may concatenate two 2-second fragments from an original CBR video.

Thus, to accommodate different video fragments, devices, and network conditions, optimized and adjusted timeout may be implemented to improve video streaming and playback performance.

In one or more embodiments, a device may request streaming video content to be delivered. Available streaming video content may be indicated by one or more manifest files provided by content providers. Manifest files may indicate video titles, available quality (e.g., high definition, UHD, etc.), video fragment sizes, and other information relevant to streaming video transmissions and playback. The device may receive one or more inputs associated with a command to play video content. The inputs may be any combination of button pushes, remote control signals, voice commands, gestures, or the like. Based on the selected video content from an input, the device may determine the available video fragments for the selected content based on the manifest file. Based on device and/or network capabilities, the device may send a request to a content provider for a particular video fragment or multiple video fragments.

In one or more embodiments, a device may receive encoded video data from a content provider. The encoded video data may be transmitted over a wireless communication medium to the requesting device for decoding and playback. The streamed video may be encoded using a video coding standard (e.g., MPEG 2, MPEG 4, H.264, H.265, HEVC, and the like). The encoding of the video data allows for the frames of streamed video content to be compressed, allowing for video to be converted to a digital format designed for computer devices. Encoded video may also be uncompressed, as more compression generally results in more loss or degradation. The device may store the received encoded video frames in one or more buffers. When the device renders the video frames, a decoder may decode the encoded video frames from a buffer for presentation on a display (e.g., on the device or on another device in communication with the device).

In one or more embodiments, a device may periodically determine whether requested streaming video content may be downloaded before a timeout expires. If a device determines that a timeout may expire before a download will complete, then the device may adjust the timeout to allow for download completion if the size of the remaining download is likely to be downloaded using a given bandwidth before a playback error occurs. Dynamically adjusting the timeout may reduce the number of playback interruptions by adjusting the timeout to account for operating conditions. A periodic determination of whether a download will be completed within a dynamically adjusted timeout may result in reduced bandwidth waste, video playback freezes, video artifacts, or other inefficiencies which may reduce user experience and waste computer resources. The device may dynamically adjust the timeout while downloading video content and/or in between downloads. For example, if the device determines that requested video will download within the timeout, the device may continue downloading and causing playback, and may store an indication of the conditions of the download for future analysis.

In one or more embodiments, if a streaming video device determines that a download will not complete before expiration of the timeout, the device may adjust the timeout to allow for the download to complete rather than having to request the same fragment and/or other video fragments. If the device did not adjust the timeout (e.g., used a static timeout), then download requests may be cancelled when such may be avoided by dynamically adjusting the timeout, and video fragments of a same or similar size may be requested and may also fail to download before expiration of the timeout. Repeat download failures may disrupt playback and undermine a viewer's experience. For example, if device and/or network parameters change, then a particular timeout may no longer be practical and may benefit from adjustment to ensure that video is downloaded quickly enough for playback.

A video streaming device may indicate a timeout to a content providing server. For example, a content providing server may use a timeout when providing streaming video. The streaming device may instruct the server to set a timeout to an infinite time (e.g., set to a long value of time) to allow for downloads to complete. Having an infinite server timeout may prevent interference with a streaming device's timeout adjustment. For example, the streaming device may decide to extend a timeout during a download, but the server's timeout may expire and cause the download to timeout. It may therefore be beneficial for a video streaming device to communicate a timeout to a content providing server.

It may be detrimental to have a timeout which is too long because a decoder may decode video frames in a buffer before the buffer is refilled with downloaded video. Therefore, it may be beneficial to set a timeout which accounts for operating parameters and reduces the chances of download and playback errors, and it may be beneficial to adjust the timeout to allow for downloads to complete.

Some devices may set a timeout based on a fragment duration and a download timeout factor. The download timeout factor may represent an increasing function of a buffer size. For example, a larger buffer may correspond to a larger timeout factor, and the larger the timeout factor, the longer a timeout may be. An optimized timeout may consider other factors to provide enhancements to the download and playback processes, and the timeout may be adjusted to allow for completion of a download rather than having to re-request a fragment.

In one or more embodiments, the timeout may be set based at least in part on network conditions (e.g., bandwidth) and fragment size. For example, a device may determine an estimated download time for a video fragment. The estimated download time may equal a fragment size (e.g., in bytes) divided by an estimated bandwidth. The bandwidth may be estimated for a device, internet service provider (ISP), or autonomous system number (ASN). The device may determine a timeout, which may be equal to the estimated download time multiplied by a download timeout factor. The timeout may also consider device, network, and other settings, and may consider historical data related to downloading and playback of video content.

In one or more embodiments, a device may determine whether a download may complete before expiration of a timeout, and if not, how long to extend the timeout to allow for the download to complete. The device may periodically estimate, based on how much of a requested download has occurred at a given time (e.g., a time used to download a portion of a requested fragment so far), whether a requested video fragment may be downloaded before the timeout expires. By recognizing a potential download failure, the device may prevent other errors and/or inefficiencies such as cancelling a download request and re-requesting a download. To determine a possible download failure, the device may estimate the additional time required to complete a download. For example, the device may determine an additional time which may be needed to complete the download of a video fragment. The additional time may be equal to the remaining size (e.g., in bytes) of a segment to download divided by the downloaded size of the segment, and multiplied by a time used to download the portion of the fragment which has been downloaded. For example, if five seconds have been used to download half of a video fragment, then the additional time should be at least another five seconds. If the additional time needed to complete a download may allow for the download to occur before a playback error, then the timeout time may be extended according to the additional time to facilitate the remainder of the download. For example, if a certain percentage of a download has completed and, given the network conditions, the additional time needed to complete the remainder of the download is within a given time, then the device may determine that an extension of the timeout may allow for a complete download before a playback error occurs.

In one or more embodiments, the additional time may be greater than or equal to a difference between the timeout and the time used to download any downloaded portion of the requested fragment. If the timeout is ten seconds, the additional time needed to download the remainder of a requested fragment is six seconds, and the time used to download a portion of the fragment so far is five seconds, then the total time to download the fragment may be estimated at eleven seconds. Therefore, the additional time of six seconds would exceed the five seconds remaining before the timeout expires. If the device determines that the additional time needed to complete the download is too long (e.g., exceeds the timeout), then the device may cancel the existing request and request the next fragment, which may be a lower quality fragment, for example, or may be the same fragment. However, if the device determines that the additional time to complete the download is not too long, then the device may extend the timeout by at least the additional time to complete the download.

In one or more embodiments, a scaling factor may be used to determine an adjusted timeout. For example, a scaling factor may be applied to the timeout calculation to extend the timeout. The timeout may be extended by using the scaling factor multiplied by the estimated download time multiplied by the download timeout factor. The scaling factor may be associated with an ASN or ISP through A/B testing, for example, and may be optimized and learned using Miyagi treatments, devices configuration, or other factors. As an example, the range of scaling factors may be between 0.5 and 2. Other scaling factor values are possible.

In one or more embodiments, using an adjusted timeout (e.g., based in part on a scaling factor), a device may determine if a requested video fragment may be downloaded before the adjusted timeout expires. If so, the device may finish the download and cause playback of the content. If not, however, the device may adjust a timeout for use in downloading a fragment. For example, the device may determine a bonus factor used to determine the additional time needed to complete a download. For example, the device may determine an additional time needed to complete the fragment download, where the additional time may be greater than or equal to the bonus factor multiplied by a difference between the timeout and the time used to download a portion of the fragment. The bonus factor may be a piece-wise linear function with an input value r, which may represent the size of the remaining portion of the fragment to download divided by the size of the downloaded portion of the fragment. The input value r may be less than or equal to $\frac{1}{4}$, and the bonus factor B may be 1 in such cases. For example, if $0<r<\frac{2}{8}$, then $B=1+(0.25-r)*4$.

In one or more embodiments, the device may adjust the timeout dynamically based on historical data associated with a device, network, service provider, type of fragment, or the like. The dynamic adjustment of the timeout in combination with the periodic monitoring of video fragment downloads may allow a device to avoid download and playback failures which may waste resources and undermine user experience.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates a process 100 associated with downloading video data or files, in accordance with one or more example embodiments of the present disclosure.

Referring to FIG. 1, the process 100 may include an exchange of video files and/or data between a device 102 and one or more content providers (e.g., server 104). At step 106, the device 102 may send a request for video files and/or data to the server 104. For example, the device 102 may request one or more video fragments for playback on the device 102. At step 108, as the device 102 is downloading the requested video, the device 102 may run out of video content to display as the device 102 waits for additional content to be downloaded, resulting in the device 102 experiencing stoppage or lagging (e.g., a video frame freeze on display). At step 110, if the device 102 is out of content for display, after the device 102 has waited for an expiration of a timeout while waiting for additional video content to be downloaded for playback, the device 102 may time out, resulting in a playback error and the device 102 having to cancel the request from step 106 and re-request the video.

However, the device 102 may avoid a time out or other playback error by using steps alternative to steps 106-110 and adjusting a timeout. For example, the device 102 may request video files and/or data from the server 104 at step 152. The request may include one or more video segments for download and playback. As the device 102 waits or downloads content from the server 104 at step 154, the device 102 may determine whether the requested content will be downloaded before the timeout. If so, the download may continue. If not, however, the device 102 may adjust the timeout (for example, determine a new timeout that is longer than the current timeout) at step 156 to allow for the download to be complete at step 158 before a timeout event occurs. For example, if the device 102 determines that only a small portion of the download may not complete before expiration of the timeout and that the remaining portion of the download may complete before a playback error occurs, the device 102 may extend the timeout and allow the download to complete. This way, the device 102 may avoid a timeout and its consequences by dynamically adjusting the timeout.

Figure 2:
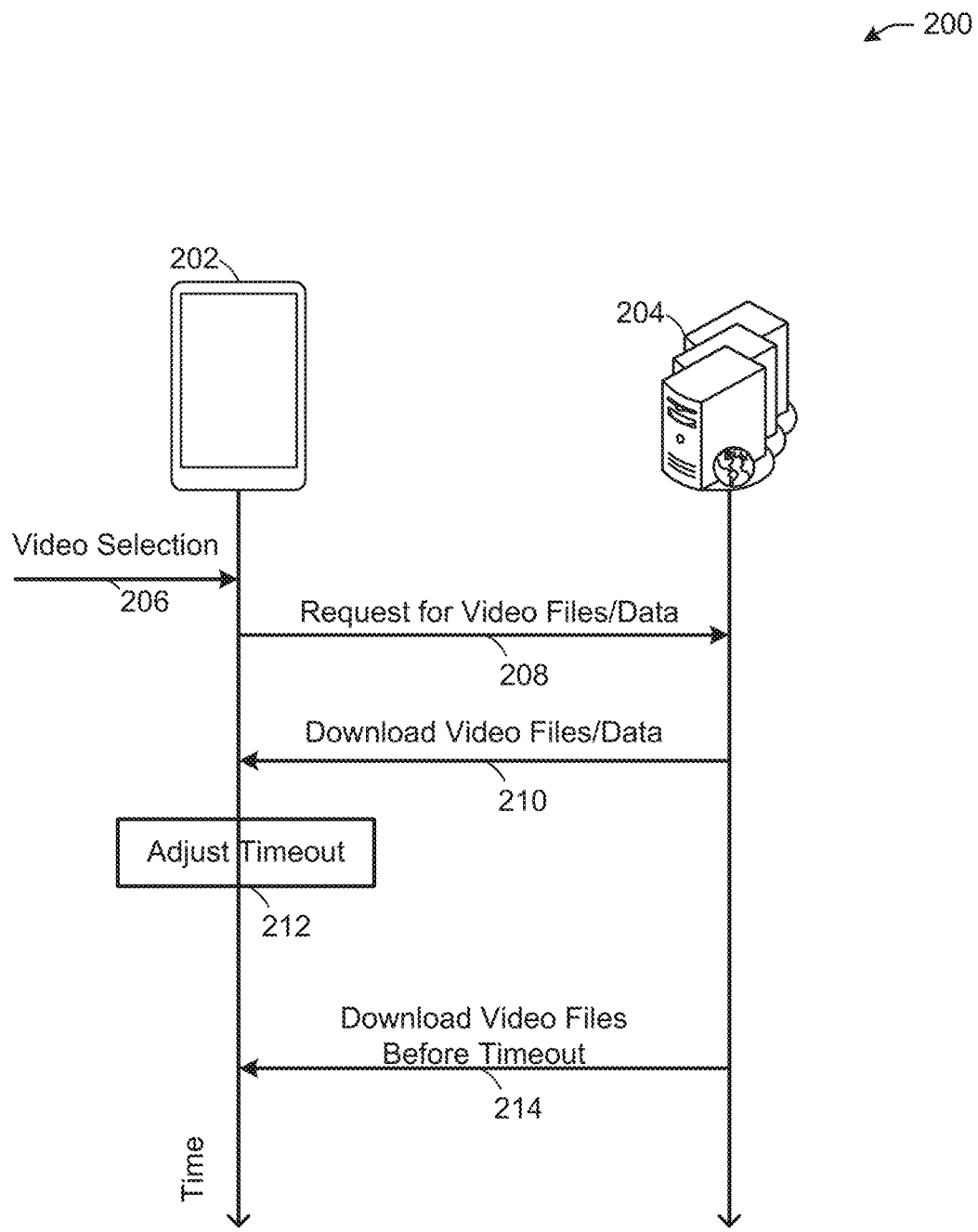
FIG. 2 illustrates an exchange of video data or files between devices, in accordance with one or more example embodiments of the present disclosure.

FIG. 2 illustrates an exchange 200 of video data or files between devices, in accordance with one or more example embodiments of the present disclosure.

Referring to FIG. 2, a device 202 may request and receive video content from one or more content providers (e.g., server 204). The device 202 may receive a video selection at step 206, and may send a request to the server 204 for the selected video at step 208. The server 204 may process the request and may provide the requested video to the device 202, which may download the video files and/or data at step 210. While downloading the video content, the device 202 may adjust a timeout at step 212 in response to a determination that the requested content will not complete its download before the timeout expires. After adjusting the timeout 212, the device 202 may optionally send an indication of the adjusted timeout to the server 204, and then may complete the download before expiration of the adjusted timeout at step 214.

In one or more embodiments, the device 202 may receive a video selection at step 206 in one or more ways. The device 202 may receive button inputs, wireless signals, voice commands, gestures, or other inputs which may be provided directly to the device 102 or may be provided indirectly.

In one or more embodiments, the device 202 may store a manifest file, which may be provided by the server 204. The manifest file may identify the available video content at the server 204, the video types and qualities, the sizes of the video fragments available for download, and other relevant information for downloading video content. The device 202 may determine which video fragments are available based on the received video selection input. For example, if the device 202 receives an input indicating a user selection of video programming to render, the device 202 may determine that UHD video fragments are available for the selected video program, and may request one or more UHD video fragments at step 208. Knowing the size of the UHD video fragments, the device 202 may estimate the time needed to download a requested fragment, and may estimate a timeout using the estimated download time. The estimated download time may vary based on the download bandwidth and the size of the fragment being downloaded, and may be adjusted during a download as explained further below In one or more embodiments, the device 202 may adjust the timeout by periodically determining whether the remaining portion of a download will complete before expiration of the timeout. For example, because the device 202 may know the size of a requested video fragment being downloaded (e.g., at step 210), the device 202 may be able to determine, based on the amount of the video file which has downloaded at a given time and based on the remaining portion of the video to download, whether the remaining portion of the video may finish downloading before expiration of the timeout. At any time during a download, the device 202 may adjust the timeout. For example, if the device 202 estimates that a requested video fragment will not download completely before expiration of the timeout, the device 202 may adjust the timeout at step 212 and may allow for the download to complete before expiration of the adjusted timeout. This way, the device 202 may avoid a timeout and wasted resources in re-requesting a download which may complete before the occurrence of a playback error.

Figure 3:
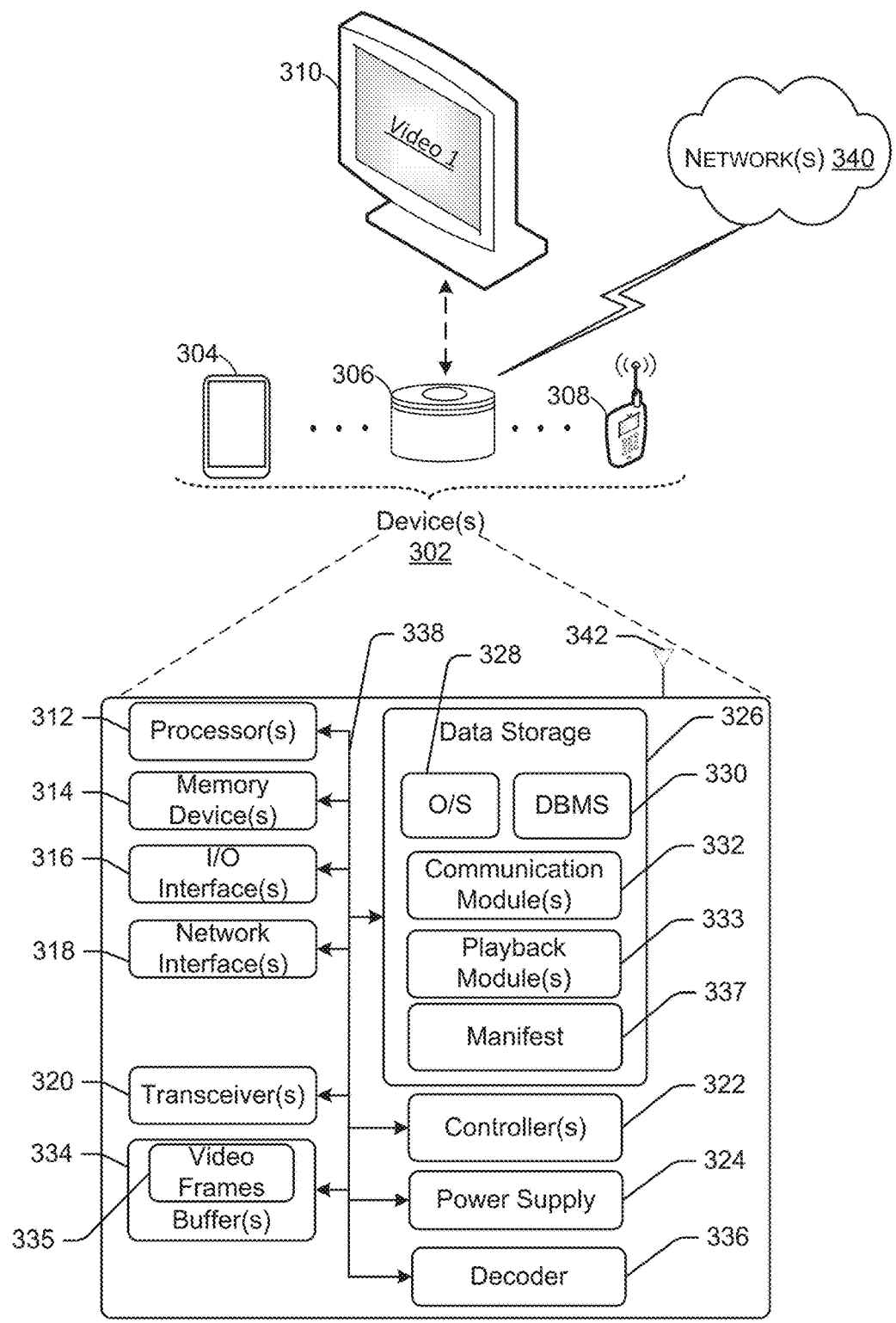
FIG. 3 depicts an illustrative video streaming device, in accordance with one or more example embodiments of the present disclosure.

FIG. 3 depicts an illustrative video streaming device 302, in accordance with one or more example embodiments of the present disclosure.

Referring to FIG. 3, the device 302 may be one or more video streaming devices such as device 304, device 306, and device 308, which may be configured to request, receive, and cause playback of streaming video content. Streaming video content may be played back on the device 302, or on display 310, which may be operatively connected to the device 302.

In one or more embodiments, the devices 302 may include smartphones, laptops, desktops, tablet computers, media players, internet appliances, televisions, smart home devices, digital display screens, video recording systems, audio recording systems, image capturing systems, telephones, messaging systems, or any other devices with one or more touch buttons screens (e.g., the display 310), or another surface with which a user may touch as a form of interacting with the device 302 to generate a device action.

The device 302 may include one or more buffers 334 and a decoder 336. A buffer 334 may store video encoded frames (e.g., video frames 335) for video playback. Buffers 334 may be different sizes capable of storing different numbers of video frames. Buffers 334 may store specific types of video frames (e.g., reference frames) used for video playback. The decoder 336 may decode the video frames in the buffers 334 for playback. The decoder 336 may include processing circuitry (e.g., one or more integrated circuits) which may convert video signals into digital video output for playback. The decoder 336 may include one or more analog processors, timing processors, analog-to-digital converters, and communication interfaces. The digital video output produced by the decoder 336 may be rendered at a display (e.g., display 310). The encoded video stored in the buffers 334 may be encoded in a format recognizable and designed for the decoder 336 to convert for the production of computer-based digital video.

In one or more embodiments, the data storage 326 may store a manifest 337, which may indicate available content and the parameters of that content. For example, the device 302 may cause presentation of a graphical user interface listing the available video content (e.g., video 1, video 2, video 3) indicated by the manifest 337. The device 302 may receive an input indicating a selection of video 1. The selection may indicate a specific quality of video 1 (e.g., HD, UHD), or the device 302 may determine the quality of video fragments of video 1 to request based on available bandwidth, and/or based on other device and network capabilities.

In one or more embodiments, the device 302 may receive an input indicating that a user has selected video 1 for playback, and may request one or more video 1 fragments (e.g., from server 204 of FIG. 2). The device 302 may send a request for the requested fragments via the network(s) 340, and the requested video 1 fragments may be received via the network(s) 340. The video frames 335 of downloaded video 1 fragments may be stored in the buffers 334 in an encoded form. The decoder 336 may decode the video frames 335 stored in the buffer 334, and the device 302 may cause the decoded video frames to be rendered on display 310.

If the decoder 336, which may decode at a particular rate (e.g., frames per second), decodes the video frames 335 in the buffers 334 at a rate which outpaces the downloading and storage of new video frames in the buffers 334, then the buffers 334 may end up at some point without any frames for the decoder 336 to decode. The result may be that there are no video frames to render, so video playback may stall as the device 302 waits for more frames. It may therefore be desirable to reduce the likelihood of such a scenario by, for example, by using a timeout to determine whether video will download before a playback error occurs. If a timeout expires during a download, the device 302 may request the download again (e.g. from server 204 of FIG. 2). However, if the device 302 determines that extending the timeout may allow for a download to complete before a playback error, the device 302 may extend the timeout to allow for a download to complete rather than having to request the download again.

In an illustrative configuration, the device 302 may include one or more processors (processor(s)) 312, one or more memory devices 314 (generically referred to in this section as memory 314), one or more input/output (I/O) interfaces 316, one or more network interfaces 318, one or more transceivers 320, one or more controllers 322, a power supply 324 (e.g., one or more batteries or power receptacle input), data storage 326, one or more buffers 334 (e.g., video frame buffers), and a decoder 336 (e.g., video decoder). The device 302 may further include one or more buses 338 that functionally couple various components of the device 302. The device 302 may optionally include one or more antenna (e) 342 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, an RFID antenna, and so forth.

The bus(es) 338 may include at least one of a system bus, a memory bus, an address bus, or a message bus, and may permit the exchange of information (e.g., data (including computer-executable code), signaling, etc.) between various components of the device 302. The bus(es) 338 may include, without limitation, a memory bus or a memory controller, a peripheral bus, an accelerated graphics port, and so forth. The bus(es) 338 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 314 of the device 302 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 314 may include multiple different types of memory such as various types of static random access memory (SRAM), various types of dynamic random access memory (DRAM), various types of unalterable ROM, and/or writeable variants of ROM such as electrically erasable programmable read-only memory (EE-PROM), flash memory, and so forth. The memory 314 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 326 may include removable storage and/or non-removable storage including, but not limited to, magnetic storage, optical disk storage, and/or tape storage. The data storage 326 may provide non-volatile storage of computer-executable instructions and other data. The memory 314 and the data storage 316, removable and/or non-removable, are examples of computer-readable storage media (CRSM) as that term is used herein.

The data storage 326 may store computer-executable code, instructions, or the like that may be loadable into the memory 314 and executable by the processor(s) 312 to cause the processor(s) 312 to perform or initiate various operations. The data storage 326 may additionally store data that may be copied to the memory 314 for use by the processor(s) 312 during the execution of the computer-executable instructions. Moreover, output data generated as a result of execution of the computer-executable instructions by the processor(s) 312 may be stored initially in the memory 314, and may ultimately be copied to the data storage 326 for non-volatile storage.

More specifically, the data storage 326 may store one or more operating systems (O/S) 328, one or more database management systems (DBMS) 330; and one or more program module(s), applications, engines, computer-executable code, scripts, or the like such as, for example, one or more communication module(s) 332 and one or more playback module(s) 333. Some or all of these module(s) may be or include sub-module(s). Any of the components depicted as being stored in the data storage 326 may include any combination of software, firmware, and/or hardware. The software and/or firmware may include computer-executable code, instructions, or the like that may be loaded into the memory 314 for execution by one or more of the processor(s) 312. Any of the components depicted as being stored in the data storage 326 may support the functionality described in reference to the corresponding components named earlier in this disclosure.

The data storage 326 may further store various types of data utilized by the components of the device 312. Any data stored in the data storage 326 may be loaded into the memory 314 for use by the processor(s) 312 in executing computer-executable code. In addition, any data depicted as being stored in the data storage 326 may potentially be stored in one or more datastore(s) and may be accessed via the DBMS 330 and loaded in the memory 314 for use by the processor(s) 312 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 3, an example datastore(s) may include, for example, user account or user profile data, user device settings, network settings, user device preferences and authorizations, and other information.

The processor(s) 312 may be configured to access the memory 314 and execute the computer-executable instructions loaded therein. For example, the processor(s) 312 may be configured to execute computer-executable instructions of the various program module(s), applications, engines, or the like of the device 312 to cause or facilitate various operations to be performed in accordance with one or more embodiments of the disclosure. The processor(s) 312 may include any suitable processing unit capable of accepting data as input, processing the input data in accordance with stored computer-executable instructions, and generating output data. The processor(s) 312 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an Image Signal Processor (ISP), a digital signal processor (DSP), and so forth. Further, the processor(s) 312 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 312 may be capable of supporting any of a variety of instruction sets.

Referring now to functionality supported by the various program module(s) depicted in FIG. 3, the communication module(s) 332 may include computer-executable instructions, code, or the like that responsive to execution by one or more of the processor(s) 312 may perform functions including, but not limited to, communicating with remote servers or devices, communicating with remote datastores, communicating with local servers or devices on an intranet, sending or receiving information and instructions, sending or receiving orders, and the like. For example, the communication module(s) 332 may provide the device 302 with indications of network conditions (e.g., bandwidth) to facilitate determinations of a timeout, and may facilitate communications with a content server (e.g., server 204 of FIG. 2) to receive video manifest files (e.g., manifest 337) so that the device 302 may be able to determine and adjust a timeout based on a requested video fragment size and the bandwidth available to download the requested video. The playback module(s) 333 may facilitate playback of the video frames 335. For example, when the processor(s) 312 execute computer-executable instructions, code, or the like of the playback module(s) 333, the processor(s) 312 may cause playback of the video frames 335.

Referring now to other illustrative components depicted as being stored in the data storage 326, the 0/S 328 may be loaded from the data storage 326 into the memory 314 and may provide an interface between other application software executing on the device 302 and the hardware resources of the device 302. More specifically, the 0/S 328 may include a set of computer-executable instructions for managing the hardware resources of the device 302 and for providing common services to other application programs (e.g., managing memory allocation among various application programs). In certain example embodiments, the 0/S 328 may control execution of the other program module(s) to dynamically enhance characters for content rendering. The O/S 328 may include any operating system now known or which may be developed in the future including, but not limited to, any server operating system, any mainframe operating system, or any other proprietary or non-proprietary operating system.

The DBMS 330 may be loaded into the memory 314 and may support functionality for accessing, retrieving, storing, and/or manipulating data stored in the memory 314 and/or data stored in the data storage 326. The DBMS 330 may use any of a variety of database models (e.g., relational model, object model, etc.) and may support any of a variety of query languages. The DBMS 330 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the device 302 is a mobile device, the DBMS 330 may be any suitable light-weight DBMS optimized for performance on a mobile device.

Referring now to other illustrative components of the device 302, the input/output (I/O) interface(s) 316 may facilitate the receipt of input information by the device 302 from one or more I/O devices as well as the output of information from the device 302 to the one or more I/O devices. The I/O devices may include any of a variety of components such as a display or display screen (e.g., display 310) having a touch surface or touchscreen; an audio output device for producing sound, such as a speaker; an audio capture device, such as a microphone; an image and/or video capture device, such as a camera; a haptic unit; and so forth. Any of these components may be integrated into the device 302 or may be separate. The I/O devices may further include, for example, any number of peripheral devices such as data storage devices, printing devices, and so forth.

The I/O interface(s) 316 may also include an interface for an external peripheral device connection such as universal serial bus (USB), micro-USB, FireWire, Thunderbolt, Ethernet port or other connection protocol that may connect to one or more networks. The I/O interface(s) 316 may also include a connection to one or more of the antenna(e) 342 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, a WiMAX network, a 3G network, a ZigBee network, etc.

The device 302 may further include one or more network interface(s) 318 via which the device 302 may communicate with any of a variety of other systems, platforms, networks, devices, and so forth. The network interface(s) 318 may enable communication, for example, with one or more wireless routers, one or more host servers, one or more web servers, and the like via one or more networks.

The device 302 may be configured to communicate via one or more networks with one or more servers, user devices, or the like, to receive video content. The device 302 may be configured to communicate via one or more networks 340. Such network(s) 340 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) 340 may have any suitable communication range associated therewith and may include, for example, global networks (e.g., the Internet), metropolitan area networks (MANs), wide area networks (WANs), local area networks (LANs), or personal area networks (PANs). In addition, such network(s) 340 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The optional antenna(e) 342 may include any suitable type of antenna depending, for example, on the communications protocols used to transmit or receive signals via the antenna(e) 342. Non-limiting examples of suitable antennae may include directional antennae, non-directional antennae, dipole antennae, folded dipole antennae, patch antennae, multiple-input multiple-output (MIMO) antennae, or the like. The antenna(e) 342 may be communicatively coupled to one or more transceivers 310 or radio components to which or from which signals may be transmitted or received.

The transceiver(s) 320 may include any suitable radio component(s) for—in cooperation with the antenna(e) 342—transmitting or receiving signals in the bandwidth and/or channels corresponding to the communications protocols utilized by the device 302 to communicate with other devices. The transceiver(s) 320 may include hardware, software, and/or firmware for modulating, transmitting, or receiving—potentially in cooperation with any of antenna(e) 342—communications signals according to any communication protocols. The transceiver(s) 320 may include any known receiver and baseband suitable for communicating via the communications protocols utilized by the device 302. The transceiver(s) 320 may further include a low noise amplifier (LNA), additional power signal amplifiers (PA), an analog-to-digital (A/D) converter, one or more buffers, a digital baseband, or the like.

The controller(s) 322 may be any microcontroller or microprocessor configured to control one or more operations of the device 302. The power supply 324 may be a battery, such as a lithium-ion battery. The power supply 324 may be provided power from a power receptacle or other power charging device.

It should be appreciated that the program module(s), applications, computer-executable instructions, code, or the like depicted in FIG. 3 as being stored in the data storage 326 are merely illustrative and not exhaustive and that the processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the device 302, and/or hosted on other computing device(s) accessible via one or more networks, may be provided to support the functionality provided by the program module(s), applications, or computer-executable code depicted in FIG. 3 and/or additional or alternate functionality. Further, functionality may be modularized differently such that processing described as being supported collectively by the collection of program module(s) depicted in FIG. 4 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 3 may be implemented, at least partially, in hardware and/or firmware across any number of devices.

It should further be appreciated that the device 302 may include alternate and/or additional hardware, software, or firmware components beyond those described or depicted without departing from the scope of the disclosure. More particularly, it should be appreciated that software, firmware, or hardware components depicted as forming part of the device 302 are merely illustrative and that some components may not be present or additional components may be provided in various embodiments. While various illustrative program module(s) have been depicted and described as software module(s) stored in the data storage 316, it should be appreciated that the functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Figure 4:
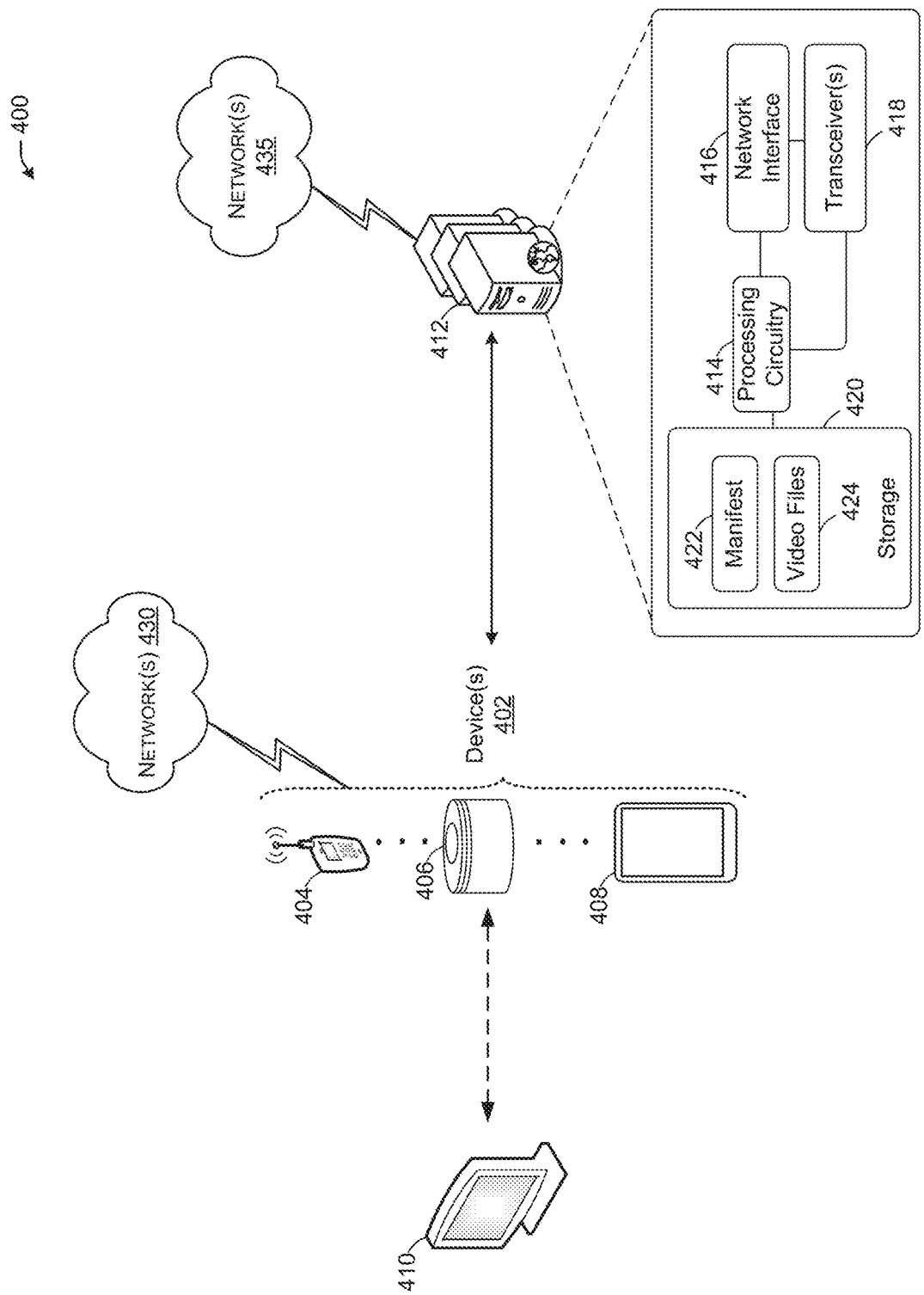
FIG. 4 depicts an illustrative video streaming system, in accordance with one or more example embodiments of the present disclosure.

FIG. 4 depicts an illustrative video streaming system 400, in accordance with one or more example embodiments of the present disclosure.

Referring to FIG. 4, the streaming system 400 may include one or more devices 402, including device 408, device 404, and device 406, which may request, download, and cause playback of streaming video. The devices 402 may play the content on their own displays, or may cause playback at a remote display (e.g., display 410), which may be wirelessly connected or connect via hardwiring.

Still referring to FIG. 4, the devices 402 may communicate with one or more content providers (e.g., server 412) to facilitate delivery and playback of streaming video. The devices 402 and the server 412 may be configured to communicate with each other via one or more communications networks 430 and/or 435 wirelessly or wired. The device 402 may also communicate peer-to-peer or directly with each other with or without the server 412. The communication networks 430 and 435 may be the same network or different networks, and they may be in communication with one another.

Still referring to FIG. 4, the server 412 may include one or more components, such as processing circuitry 414, a network interface 416, one or more transceivers 418, and storage 420, which may include one or more manifest files 422 and video files 424 (e.g., video fragments and frames).

The devices 402 may include smartphones, laptops, desktops, tablet computers, media players, internet appliances, televisions, smart home devices, digital display screens, video recording systems, audio recording systems, image capturing systems, telephones, messaging systems, or any other devices with one or more touch buttons screens (e.g., the display 410), or another surface with which a user may touch as a form of interacting with the device 402 to generate a device action.

The display 410 may be, for example, an electrophoretic display, an electrowetting display, a liquid crystal display (LCD), an organic light-emitting diode, (OLED) display, or the like.

Any of the communications networks 430 and/or 435 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 430 and/or 435 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 430 and/or 435 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The storage 420 may include removable storage and/or non-removable storage including, but not limited to, magnetic storage, optical disk storage, and/or tape storage. The storage 420 may provide non-volatile storage of computer-executable instructions and other data. The storage 420, removable and/or non-removable, is an example of computer-readable storage media (CRSM) as that term is used herein.

The storage 420 may store computer-executable code, instructions, or the like that may be executable by the processing circuitry 414 to cause the processing circuitry 414 to perform or initiate various operations. The storage 420 may additionally store data that may be copied for use by the processing circuitry 414 during the execution of the computer-executable instructions. Moreover, output data generated as a result of execution of the computer-executable instructions by the processing circuitry 414 may be copied to the storage 420 for non-volatile storage.

More specifically, the storage 420 may store one or more program module(s), applications, engines, computer-executable code, scripts, or the like. Some or all of these module(s) may be or include sub-module(s). Any of the components depicted as being stored in the storage 420 may include any combination of software, firmware, and/or hardware. The software and/or firmware may include computer-executable code, instructions, or the like that may executed by one or more of the processing circuitry 414. Any of the components depicted as being stored in the storage 420 may support the functionality described in reference to the corresponding components named earlier in this disclosure.

The storage 420 may further store various types of data utilized by the components of the server 412. Any data stored in the storage 420 may be used by the processing circuitry 414 in executing computer-executable code. In addition, any data depicted as being stored in the storage 420 may potentially be stored in one or more datastore(s). The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 4, an example datastore(s) may include, for example, user account or user profile data, user device or battery settings, user device preferences and authorizations, and other information.

The storage 420 may store one or more manifest files 422 and video files 424. The manifest files 422 may be provided to streaming video devices (e.g., devices 402) to provide an available selection of video content and its parameters, such as titles, video fragment sizes, video quality, and the like. The video files 424 may include coded video frames formed in groups of pictures sent in video fragments. The video files 424 may be live or pseudo-live, and may include movies, television shows, and/or other video content, and may be represented by video frames coded for computer-based transmissions, decoding, and playback. The video files 424 may be encoded using video coding standards for which computer encoders and decoders are designed. The storage of the manifest files 422 and video files 424 may allow the server 412 to maintain a video selection, which may be updated, and updated manifest files 422 may be stored and provided to other devices, and when requests for available video are received by the server 412, the server 412 may process those requests and send the corresponding video files 424.

The processing circuitry 414 may be configured to access the storage 420 and execute the computer-executable instructions loaded therein. For example, the processing circuitry 414 may be configured to execute computer-executable instructions of the various program module(s), applications, engines, or the like of the server 412 to cause or facilitate various operations to be performed in accordance with one or more embodiments of the disclosure. The processing circuitry 414 may include any suitable processing unit capable of accepting data as input, processing the input data in accordance with stored computer-executable instructions, and generating output data. The processing circuitry 414 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an Image Signal Processor (ISP), a digital signal processor (DSP), and so forth. Further, the processing circuitry 314 may have any suitable microarchitecture design that includes any number of constituent components such as, for example, registers, multiplexers, arithmetic logic units, cache controllers for controlling read/write operations to cache memory, branch predictors, or the like. The microarchitecture design of the processing circuitry 414 may be capable of supporting any of a variety of instruction sets.

The processing circuitry 414 may execute computer-executable instructions to identify playback requests received from the one or more devices 402. The processing circuitry 414 may identify requested video fragments (e.g., video files 424) and may cause the server 412 to send the requested fragments to the one or more devices 402. The processing circuitry 414 may receive an indication from the one or more devices 402 that a download has a timeout, and may stop sending requested video upon the determination of a timeout event, for instance, based on the receipt of a time out indication from a device 402 or the expiration of a timeout at the server 412. In certain embodiments, the processing circuitry 414 may identify a received indication from the one or more devices 402 to set its timeout to a value far exceeding what might be practical, such as a maximum value or infinite, in which case the processing circuitry may continue to send requested video until the requested video has been downloaded by the one or more devices 402 or until it is otherwise notified by the one or more devices 402, such as in the event of the expiration of an adjusted timeout.

The server 412 may further include one or more network interface(s) 416 via which the server 412 may communicate with any of a variety of other systems, platforms, networks, devices, and so forth. The network interface(s) 416 may enable communication, for example, with one or more wireless routers, one or more host servers, one or more web servers, and the like via one or more networks.

The transceivers 418 may include any suitable type of transceiver depending, for example, on the communications protocols used to transmit or receive signals. The transceivers 418 may additionally, or alternatively, include a Wi-Fi transceiver configured to transmit or receive signals in accordance with established standards and protocols. The transceivers 418 may include any suitable radio component(s) for transmitting or receiving signals in a bandwidth and/or channels. The transceivers 418 may include any known receiver and baseband suitable for communicating via the communications protocols utilized by the server 412. The transceivers 418 may further include a low noise amplifier (LNA), additional power signal amplifiers (PA), an analog-to-digital (A/D) converter, one or more buffers, a digital baseband, or the like.

It should be appreciated that the program module(s), applications, computer-executable instructions, code, or the like depicted in FIG. 4 as being stored in the storage 420 are merely illustrative and not exhaustive and that the processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the server 412, and/or hosted on other computing device(s) accessible via one or more networks, may be provided to support the functionality provided by the program module(s), applications, or computer-executable code depicted in FIG. 4 and/or additional or alternate functionality. Further, functionality may be modularized differently such that processing described as being supported collectively by the collection of program module(s) depicted in FIG. 4 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 4 may be implemented, at least partially, in hardware and/or firmware across any number of devices.

It should further be appreciated that the server 412 may include alternate and/or additional hardware, software, or firmware components beyond those described or depicted without departing from the scope of the disclosure. More particularly, it should be appreciated that software, firmware, or hardware components depicted as forming part of the server 412 are merely illustrative and that some components may not be present or additional components may be provided in various embodiments. While various illustrative program module(s) have been depicted and described as software module(s) stored in the storage 420, it should be appreciated that the functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Figure 5A:
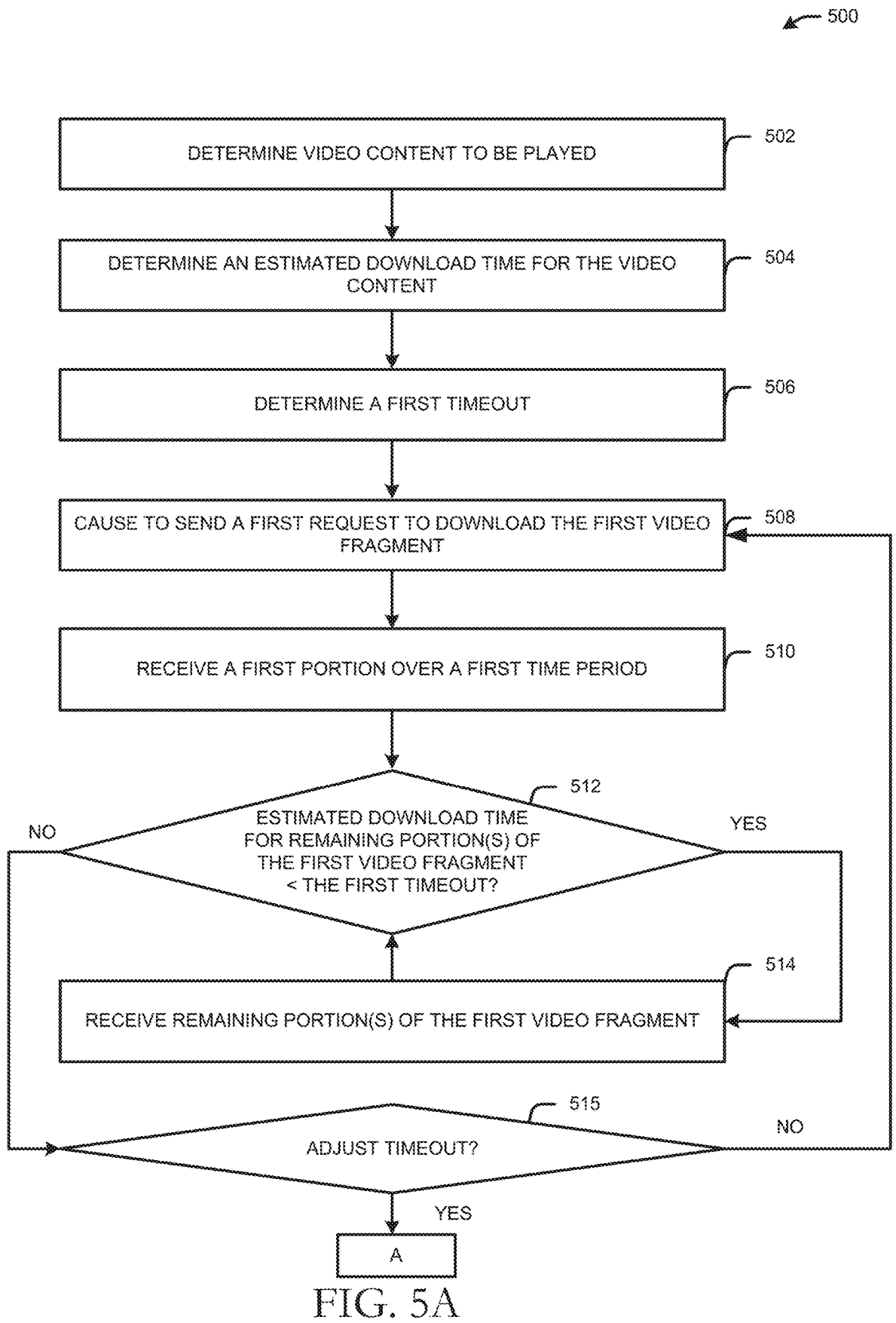
FIG. 5A illustrates a flow diagram for a process for streaming video, in accordance with one or more example embodiments of the present disclosure.

FIG. 5A illustrates a flow diagram for a process 500 for streaming video, in accordance with one or more example embodiments of the present disclosure.

At block 502, processing circuitry of a device (e.g., device 302 of FIG. 3) may determine content (e.g., UHD, HD, SD, etc.) to be played. The device may receive one or more inputs indicating a selection of video content to be played at the device or at another device. The inputs may be associated with a video available for download at the device 502. Other quality video selections may be selected given based on the inputs, device settings, and/or network capabilities.

At block 504, the processing circuitry of the device may determine an estimated download time for the selected content. The device may have a manifest (e.g., manifest file 337 of FIG. 3), which may be provided by a content provider (e.g., server 412 of FIG. 4), and the manifest may indicate the size of video fragments associated with the selected video. To determine the estimated download time, the device may divide the fragment size over an estimated bandwidth used to download the selected video fragment.

At block 506, the processing circuitry of the device may determine a first timeout. The timeout may be a threshold time in which a video fragment should be downloaded in order to prevent a playback error. To determine the timeout, the device may multiply the estimated download time by a download timeout factor, which may be an increasing function with a positive value. The larger the value of the download timeout factor, the longer the timeout may be.

At block 508, the processing circuitry of the device may cause the device to send a first request to download a first video fragment (e.g., a video fragment of the selected video). The request may include one or more signals with one or more indications sent to a content provider (e.g., server 412 of FIG. 4). The request may be sent over a communication network (e.g., communication network 340 of FIG. 3).

At block 510, the processing circuitry of the device may receive a first portion of the first video fragment over a time period. For example, during a time period (e.g., a time taken to download), the device may receive an amount of a video fragment (e.g., in bytes). The device may monitor the time since a video fragment request was sent and the size of the fragment which has been downloaded. This way, the device may be able to monitor the download progress and outlook of the requested video fragment.

At block 512, the processing circuitry of the device may determine whether the first video fragment will download in its entirety before the first timeout (e.g., is an estimated download time for remaining portions of the video fragment less than the first timeout). Knowing the size of the requested video fragment, the size of the video fragment downloaded at a given time, the time since the video fragment request was sent, and the timeout, the device may perform this estimation. For example, the device may predict an additional time needed to finish the download of the requested video fragment. The additional time may be the size of the requested video fragment (e.g., one or more portions or frames) which have not yet been downloaded divided by the size of the requested video fragment which has been downloaded, then multiplied by the time which has transpired for the download of the size of the video fragment which has been downloaded. If the additional time is greater than the remaining timeout, then the timeout may be extended to allow for the additional time. The additional time may be greater than or equal to a difference between the timeout and the time which has transpired for the download of the size of the video fragment which has been downloaded. If the download may be completed before expiration of the additional time and without resulting in playback error, the device may extend the timeout to allow for the additional time (e.g., determine a second timeout). If the device determines that the entire video fragment will download in its entirety before the first timeout, then at block 514 the device may receive another portion of the video fragment. The download may complete before expiration of the timeout, but the device may continue to monitor a fragment download even after a determination that, at a given time, the fragment appears likely to download before the timeout. It may be possible that conditions change, and therefore a subsequent determination at block 512 may result in a recognition that a fragment may not download in its entirety before expiration of the first timeout. If the device determines at block 512 that the first video fragment will not download in its entirety before the first timeout, the process may proceed to block 515.

At block 515, the processing circuitry of the device may determine whether or not to adjust the timeout to allow for a video fragment to continue to download. For example, the processing circuitry may determine whether an amount of estimated time needed to download any remaining portions of the fragment is below a threshold time. If the estimated remaining time is below a threshold, then the processing circuitry may determine that an adjusted timeout may be appropriate to extend the timeout to allow the download to complete. If the processing circuitry determines that an adjusted timeout is appropriate, the process may proceed to block A. If the processing circuitry determines that a timeout is not appropriate (e.g., the remaining portion of a fragment would likely require a time longer than a time threshold to finish downloading), the processing circuitry may allow the current download timeout to expire, resulting in a download error, or the processing circuitry may initiate a time expiration event or cancellation of the download. The process may take several actions in light of a determination the not to adjust the timeout, such as returning to block 508 to send another request for the fragment, cancelling the current download request and sending an indication of the cancellation to the content provider, or allowing the expiration of the timeout and sending another download request if the timeout expires.

Figure 5B:
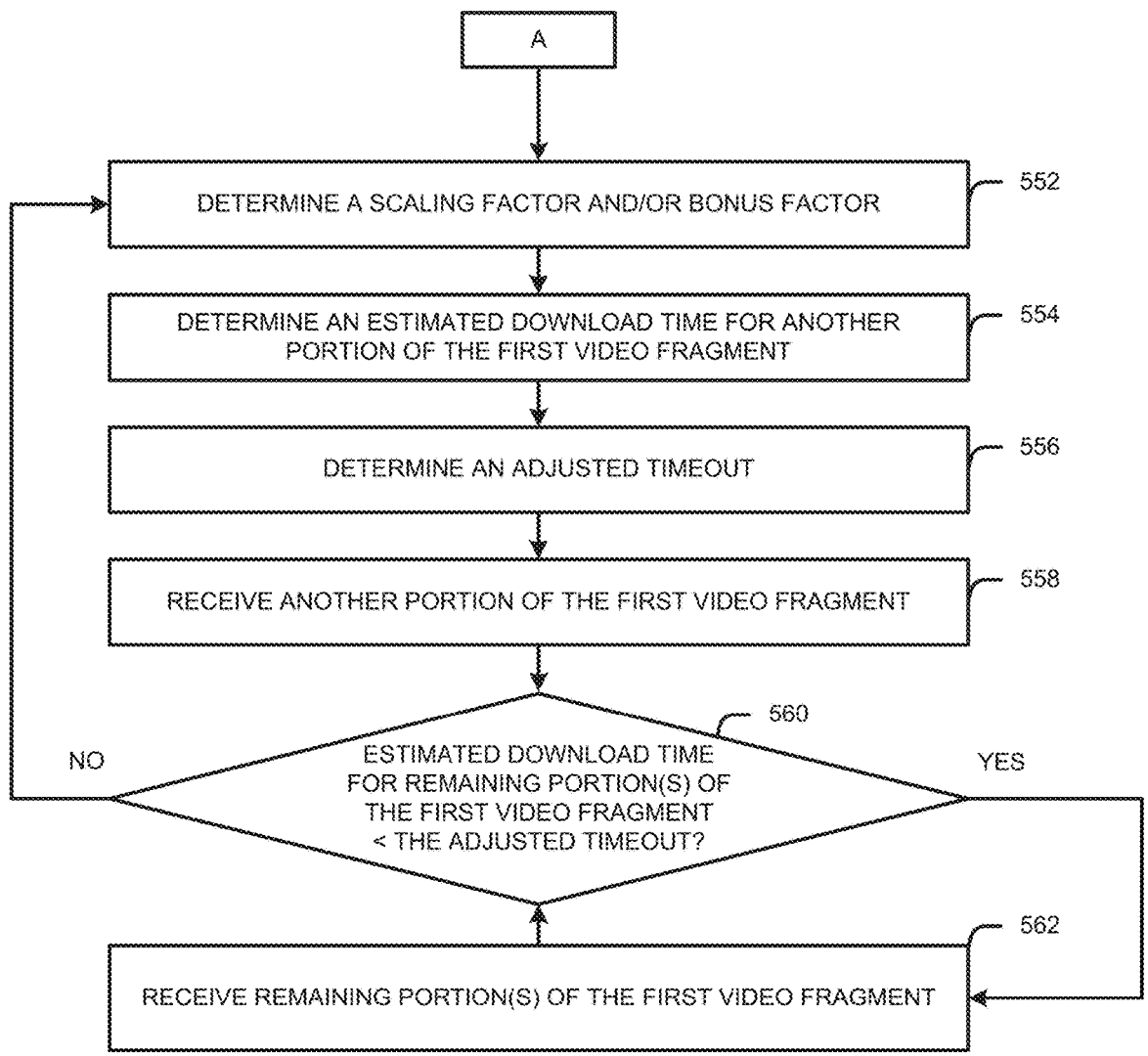
FIG. 5B illustrates a flow diagram for a process for streaming video, in accordance with one or more example embodiments of the present disclosure.

FIG. 5B illustrates a flow diagram for a process 550 for streaming video, in accordance with one or more example embodiments of the present disclosure.

The process 550 may continue from block A to block 552, where the processing circuitry of a device (e.g., device 302 of FIG. 3) may determine a scaling factor and/or a bonus factor to use in determining an adjusted/extended timeout. Using device data, network data, or other performance data, the device may determine an optimal scaling factor, which may be updated dynamically based on the updating of performance data. The scaling factor may be updated for different ASNs and/or ISPs, for example, using A/B testing. The scaling factor may be optimized and learned from Miyagi treatments and/or device configurations. The bonus factor may be applied toward the end of a download. The additional time calculation used to determine whether a fragment will be downloaded before a timeout expires may be adjusted based on the bonus factor. For example, the device may determine additional time needed to complete the fragment download, which may be greater than or equal to a difference between the timeout and the time used to download a portion of the fragment, the difference multiplied by the bonus factor. The bonus factor may be a piece-wise linear function with an input value r, which may represent the size of the remaining portion of the fragment to download divided by the size of the downloaded portion of the fragment. The input value r may be less than or equal to $\frac{1}{4}$, and the bonus factor B may be 1 in such cases. If $0 < r < \frac{2}{8}$, $B = 1 + (0.25 - r) * 4$. An adjusted/extended timeout may be based on the scaling factor and/or the bonus factor. For example, a timeout may be adjusted for a scaling factor after the device determines that a download may not complete before expiration of a timeout, and if the device determines that the requested download will not complete before expiration of the adjusted/extended timeout, the device may determine an adjusted/extended timeout using the bonus factor.

At block 554, the processing circuitry of the device may determine an estimated download time for a requested video fragment, which may be the remaining portion(s) of the requested fragment. The device may estimate the download time of a fragment based on the remaining fragment size and an estimated bandwidth used to download the fragment.

At block 556, the processing circuitry of the device may determine a second timeout. The second timeout may be a product of the scaling factor, an estimated download time, and a download timeout factor. Thus, the second timeout may be different than a previous timeout used in a prior download. This way, the timeout is adjusted dynamically to account for new information, resulting in less wasted resources responding to a timeout.

At block 558, the processing circuitry may receive another portion (e.g., one or more frames) of the requested video fragment. The portions of the requested video fragment may be downloaded and stored on the device for playback, and the device may monitor the download progress while estimating whether the entire fragment may download before the timeout.

At block 560, the processing circuitry of the device may determine whether the requested video fragment will download entirely before the second timeout (e.g., is the estimated download time for remaining portions of the requested video fragment less than the second timeout). Knowing the size of the requested video fragment, the size of the video fragment downloaded at a given time, the time since the video fragment request was sent, and the timeout, the device may perform this estimation. For example, the device may predict an additional time needed to finish the download of the requested video fragment. The additional time may be the size of the requested video fragment (e.g., one or more portions or frames) which have not yet been downloaded divided by the size of the requested video fragment which has been downloaded, then multiplied by the time which has transpired for the download of the size of the video fragment which has been downloaded. The additional time may be greater than or equal to a difference between the timeout and the time which has transpired for the download of the size of the video fragment which has been downloaded. If the device determines that the entire video fragment will download in its entirety before the first timeout, then at block 562 the device may receive any remaining portions of the video fragment. The download may complete before expiration of the timeout, but the device may continue to monitor a fragment download even after a determination that, at a given time, the fragment appears likely to download before the timeout. If the device determines at block 560 that the video fragment will not download in its entirety before the first timeout, the process may return to block 552 to determine a scaling factor and/or bonus factor to use in determining an additional time.

Figure 6:
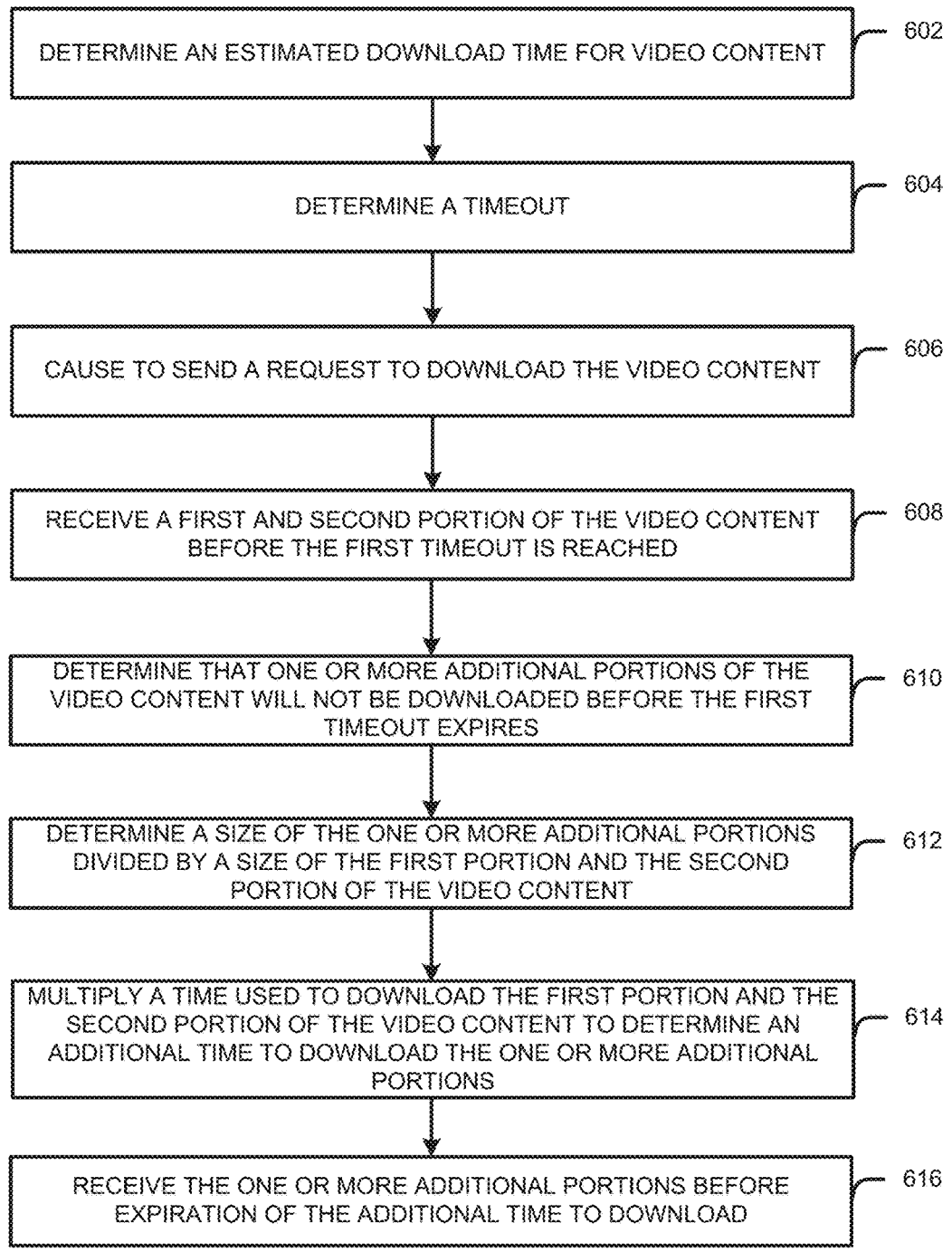
FIG. 6 illustrates a flow diagram for a process for streaming video, in accordance with one or more example embodiments of the present disclosure.

FIG. 6 illustrates a flow diagram for a process 600 for streaming video, in accordance with one or more example embodiments of the present disclosure.

At block 602, processing circuitry of a device (e.g., device 302 of FIG. 3) may determine an estimated download time for a video fragment. The video fragment may be UHD or another type, and may be of a particular size (e.g., as indicated by manifest 337 of FIG. 3). The download time may account for the size of the video fragment divided by an estimated bandwidth to download the video fragment.

At block 604, the processing circuitry of the device may determine a timeout which may be used to monitor the downloading of a video fragment. The timeout may be set based on the estimated download time for the fragment multiplied by a download time factor, which may be associated with the size of a buffer (e.g., buffers 334 of FIG. 3). The timeout may be adjusted dynamically at any time during or after video fragments. The timeout may represent a time during which a video fragment may be downloaded, and if a download does not complete before expiry of the timeout, the device may re-request the video fragment or may request another video fragment. The timeout also may represent a time when a video fragment is expected to be downloaded. If the download does not complete before the timeout expires, the device may experience video playback errors and may re-request the fragment which failed to download. Therefore, the timeout may be used to detect potential playback errors before they occur, and dynamically adjusting the timeout may prevent unnecessary timeouts and the associated consequences from occurring.

At block 606, the processing circuitry of the device may cause the device to send a request to download content (e.g., a video fragment). The request may be sent over a communication network to a content provider (e.g., server 412 of FIG. 4), and may indicate one or more video fragments to send to the device.

At block 608, the processing circuitry of the device may receive one or more portions (e.g., video frames) of the requested video fragment from the content provider before the timeout expires. The downloaded content may be stored in a buffer (e.g., buffers 334 of FIG. 3) and decoded for playback.

At block 610, the processing circuitry of the device may determine that at least one additional portion of the requested video fragment may not be downloaded before the timeout expires. The device may determine that one or more remaining portions of the requested video fragment may not be downloaded before the timeout expires. The device may continue to monitor the download to determine if any subsequent portion of the requested video content may not download before the expiration of the timeout. For example, if an estimated download time to download the remaining portions of the requested video fragment is greater than or equal to the remaining time before the timeout expires, then additional time may be determined and implemented to allow for the remaining portions to download.

At block 612, to determine additional time needed to download the at least one additional portion of the requested video fragment, the processing circuitry of the device may determine the size of the at least one additional portion divided by a size of the downloaded first and second portion. For example, this may be a ratio of a remaining download over the downloaded portions.

At block 614, to determine additional time needed to download the at least one additional portion of the requested video fragment, the processing circuitry of the device may multiply a time used to download the first and second portions by the ratio of block 612. This calculation may result in the additional time needed to download the at least one additional portion.

At block 616, the processing circuitry may receive the at least one additional portion of the video fragment before expiration of the adjusted timeout. Thus, the adjusted timeout may allow for completion of a download. In particular, the download may be allowed to continue before expiration of an extended timeout if enough of a fragment has already downloaded, and if the remaining portions of a download may be downloaded before expiration of an adjusted timeout and without causing playback error.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A device comprising memory and processing circuitry configured to:
   determine ultra high definition (UHD) content to be displayed;
   determine, for the UHD content, an estimated download time, wherein the estimated download time is based at least in part on a size of a UHD video fragment divided by an estimated bandwidth associated with downloading the UHD video fragment;
   determine a first timeout based at least in part on the estimated download time multiplied by a timeout factor;
   cause to send a first request to download the UHD video fragment, wherein the UHD video fragment comprises a first portion and a second portion;
   receive the first portion over a first time period;
   determine that the second portion will not be downloaded before expiration of the first timeout;
   determine a scaling factor for use in determining a second timeout, wherein the scaling factor is associated with at least one of an internet service provider (ISP) address, an autonomous system number (ASN), or a network condition;
   determine, for the second portion, a second estimated download time;
   determine that the second estimated download time is below a threshold;
   determine the second timeout based at least in part on the scaling factor multiplied by a product, wherein the product is the second estimated download time multiplied by the timeout factor; and
   receive the second portion before expiration of the second timeout.

2. The device of claim 1, wherein to determine that the second portion will not be downloaded before expiration of the first timeout comprises to determine a ratio of a size of the second portion divided by a size of the first portion, wherein the ratio is multiplied by the first time period.

3. The device of claim 1, wherein the memory and the processing circuitry are configured to determine the timeout factor based at least in part on a buffer size, wherein the timeout factor is a positive number.

4. The device of claim 1, wherein the UHD video fragment comprises a third portion and a fourth portion, wherein the memory and the processing circuitry are further configured to:
   receive the third portion;
   determine that the fourth portion will not be downloaded before expiration of the second timeout;
   determine a third timeout based at least in part a difference between the second timeout and a cumulative time taken to download the first portion, the second portion, and the third portion, wherein the difference is multiplied by a bonus factor; and
   receive the fourth portion before expiration of the third timeout.

5. The device of claim 4, wherein the memory and the processing circuitry are further configured to determine the bonus factor based at least in part on at least one of the following:
   a size of the third portion divided by a size of the fourth portion,
   performance data associated with the device, or performance data associated with at least one of the ISP address, the ASN, or the network condition.

6. A device comprising memory and processing circuitry configured to:
determine an estimated download time associated with a ultra high definition (UHD) content, wherein the estimated download time is based at least in part on a size of a UHD video fragment and an estimated bandwidth associated with downloading the UHD video fragment;
determine a timeout based at least in part on the estimated download time and multiplied by a timeout factor, the timeout factor associated with a video frame buffer;
cause to send a request to download the UHD video fragment, wherein the UHD video fragment comprises a first portion and a second portion; and
receive the first portion before the timeout is reached.

7. The device of claim 6, wherein the estimated download time is based at least in part on the size of the UHD video fragment divided by the estimated bandwidth.

8. The device of claim 6, wherein the timeout factor is associated with a size of the video frame buffer.

9. The device of claim 6, wherein the UHD video fragment further comprises a third portion and a fourth portion, wherein the memory and the processing circuitry are further configured to:
receive the third portion; and
determine that the fourth portion and the second portion will be downloaded before expiration of the timeout.

10. The device of claim 6, wherein the timeout is a first timeout, wherein the memory and the processing circuitry are further configured to:
determine that the second portion will not download before expiration of the first timeout;
determine a second timeout to download the second portion, wherein the second timeout expires after the first timeout;
determine that the second timeout is below a threshold; and
receive the second portion before expiration of the second timeout.

11. The device of claim 10, wherein to determine the second timeout comprises:
determining a ratio of a size of the second portion divided by a size of the first portion; and
multiplying the ratio by a time used to download the first portion.

12. The device of claim 6, wherein the timeout is a first timeout, and wherein the memory and the processing circuitry are further configured to:
determine a scaling factor for use in determining a second timeout, wherein the scaling factor is associated with at least one of an internet service provider (ISP) address, an autonomous system number (ASN), or a network condition;
determine the second timeout, wherein the second timeout is based at least in part on the scaling factor and an estimated download time associated with a second UHD video fragment, wherein the second UHD video fragment comprises a third portion and a fourth portion;
receive the third portion;
determine an additional time to download the fourth portion, wherein the additional time is based at least in part on a bonus factor, the second timeout, and a time taken to download the first portion, and wherein the additional time is in addition to the second timeout; and
receive the fourth portion before expiration of the second timeout plus the additional time.

13. The device of claim 12, wherein the scaling factor is associated with the network condition, and wherein the network condition is associated with the estimated bandwidth.

14. The device of claim 12, wherein the memory and the processing circuitry are further configured to determine the bonus factor based at least in part on at least one of the following:
the size of the third portion divided by the size of the fourth portion,
performance data associated with the device, or
performance data associated with at least one of the ISP address, the ASN, or the network condition.

15. A method, comprising:
determining, by processing circuitry of a device, an estimated download time associated with a ultra high definition (UHD) content, wherein the estimated download time is based at least in part on a size of a UHD video fragment and an estimated bandwidth associated with downloading the UHD video fragment;
determining, by the processing circuitry, a timeout based at least in part on the estimated download time multiplied by a timeout factor, the timeout factor associated with a video frame buffer;
causing to send, by the processing circuitry, a request to download the UHD video fragment, wherein the UHD video fragment comprises a first portion and a second portion; and
receiving, by the processing circuitry, the first portion before the timeout is reached.

16. The method of claim 15, wherein the estimated download time is based at least in part on the size of the UHD video fragment divided by the estimated bandwidth.

17. The method of claim 15, wherein the timeout factor is associated with a size of the video frame buffer.

18. The method of claim 15, wherein the UHD video fragment further comprises a third portion and a fourth portion, the method further comprising:
receiving the third portion; and
determining that the fourth portion and the second portion will be downloaded before expiration of the timeout.

19. The method of claim 15, further comprising:
determining that the second portion will not download before expiration of the timeout;
determining a second timeout to download the second portion, wherein the second timeout expires after the timeout;
determine that the second timeout is below a threshold; and
receiving the second portion before expiration of the second timeout.

20. The method of claim 19, wherein determining the second timeout comprises:
determining a ratio of a size of the second portion divided by a size of the first portion; and
multiplying the ratio by a time used to download the first portion.

* * * * *